(12) United States Patent
Rey et al.

(10) Patent No.: US 11,124,221 B2
(45) Date of Patent: Sep. 21, 2021

(54) METHOD FOR MANUFACTURING A PLUG IN TWO PARTS FOR A STEERING GEARBOX

(71) Applicant: JTEKT EUROPE, Irigny (FR)

(72) Inventors: Laurent Rey, Villeurbanne (FR); Mickael Guerin, Brindas (FR)

(73) Assignee: JTEKT EUROPE, Irigny (FR)

( * ) Notice: Subject to any disclaimer, the term of this patent is extended or adjusted under 35 U.S.C. 154(b) by 568 days.

(21) Appl. No.: 15/756,961

(22) PCT Filed: Sep. 16, 2016

(86) PCT No.: PCT/FR2016/052350
§ 371 (c)(1),
(2) Date: Mar. 1, 2018

(87) PCT Pub. No.: WO2017/046541
PCT Pub. Date: Mar. 23, 2017

(65) Prior Publication Data
US 2018/0273083 A1    Sep. 27, 2018

(30) Foreign Application Priority Data

Sep. 17, 2015 (FR) .................... 15/58749

(51) Int. Cl.
*B62D 5/04* (2006.01)
*B29C 45/00* (2006.01)
(Continued)

(52) U.S. Cl.
CPC ............ *B62D 5/0403* (2013.01); *B23P 19/02* (2013.01); *B29C 45/00* (2013.01); *F16H 57/029* (2013.01);
(Continued)

(58) Field of Classification Search
CPC ............................. B62D 5/0403; F16H 57/029
See application file for complete search history.

(56) References Cited

U.S. PATENT DOCUMENTS 9,962,875 B2 * 5/2018 Fuechsel ................. B29C 45/14
2015/0273748 A1   10/2015 Fuechsel et al.
(Continued)

FOREIGN PATENT DOCUMENTS

CN           104768837 A       7/2015
DE    10 2012 110373 A1       4/2014
(Continued)

OTHER PUBLICATIONS

Nov. 10, 2016 International Search Report issued in International Patent Application No. PCT/FR2016/052350.
(Continued)

*Primary Examiner* — Jason L Vaughan
*Assistant Examiner* — Amanda Kreiling
(74) *Attorney, Agent, or Firm* — Oliff PLC

(57) ABSTRACT

A plug including a hub which extends along a central axis and is defined radially by a side wall wherein an annular groove is formed, which receives a sealing member, the groove provided between a bottom wall and first annular edge wall, and a second annular edge wall, which axially define the groove, the hub being formed by the combination of a first hub section on which the first edge wall is formed, and a second hub section on which the second edge wall is formed, the first hub section and the second hub section being assembled so that they meet at a gasket face which is secant to the central axis and the bottom wall of the groove, so the line of the intersection of the gasket face with the bottom wall is contained axially between the first and second edge wall over the entire perimeter of the groove.

9 Claims, 2 Drawing Sheets

(51) Int. Cl.
*B23P 19/02* (2006.01)
*F16H 57/029* (2012.01)
*B29L 31/56* (2006.01)

(52) U.S. Cl.
CPC ....... *B29L 2031/56* (2013.01); *B32B 2435/00* (2013.01); *B32B 2605/00* (2013.01)

(56) References Cited

U.S. PATENT DOCUMENTS

| 2015/0308558 | A1 | 10/2015 | Monnet et al. |
| 2016/0201786 | A1 | 7/2016 | Chauvrat et al. |

FOREIGN PATENT DOCUMENTS

| DE | 10 2014 103576 | A1 | 9/2015 |
| FR | 2 998 879 | A1 | 6/2014 |
| JP | 2002-041182 | A | 2/2002 |
| JP | 2003-090435 | A | 3/2003 |
| JP | 2009-036232 | A | 2/2009 |

OTHER PUBLICATIONS

May 11, 2021 Office Action issued in Japanese Patent Application No. 2018-514441.

\* cited by examiner

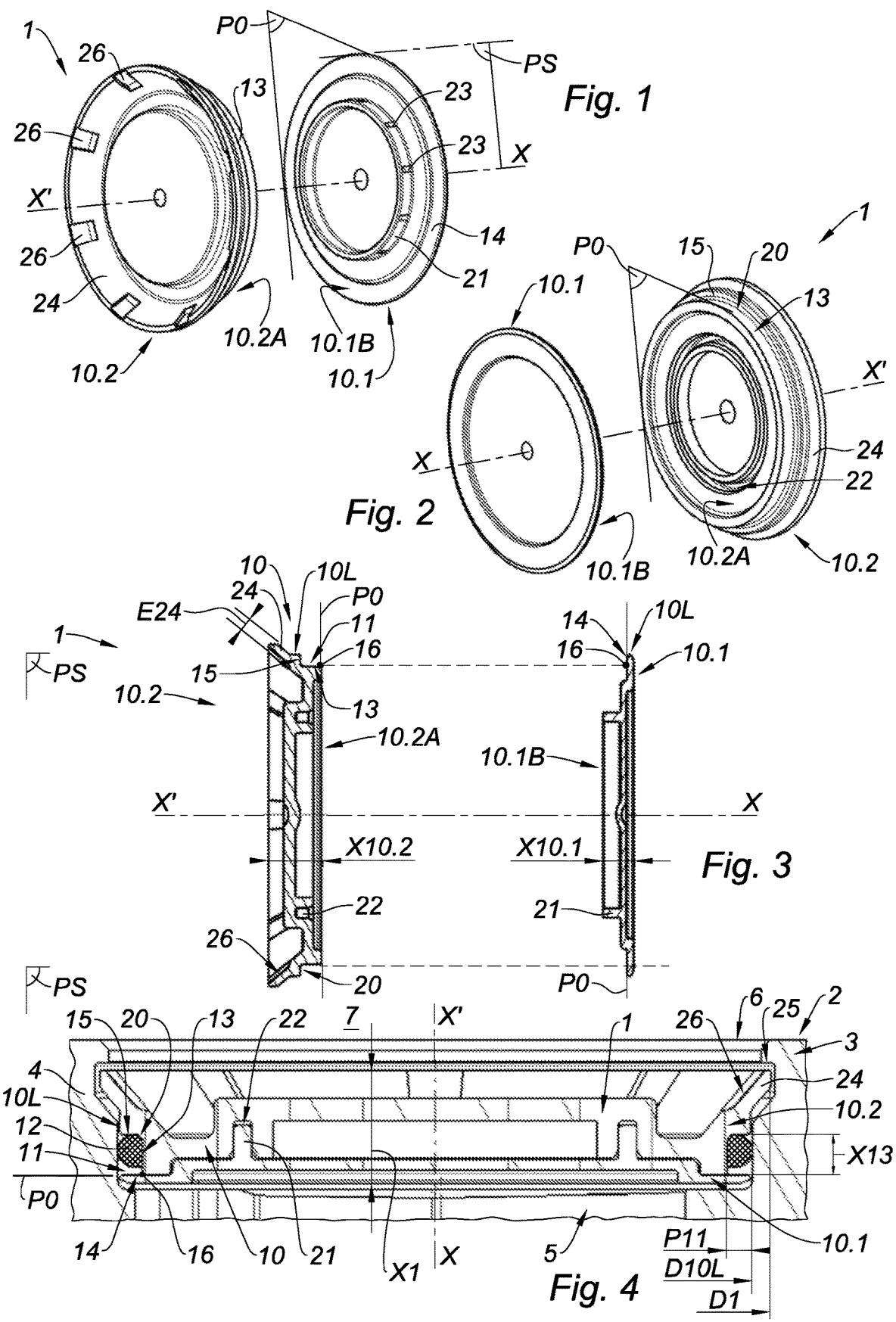

METHOD FOR MANUFACTURING A PLUG IN TWO PARTS FOR A STEERING GEARBOX

The present invention concerns the general field of power steering devices for motor vehicles, and more particularly the field of casings that are used to house the mechanisms of such steering devices.

It is known to cover all or part of a steering mechanism, and in particular the gear transmission elements of such a mechanism, by a rigid casing that ensures the guiding, the protection and/or the maintenance in a lubricant of said mechanism.

In order to allow the setting up or the maintenance of the mechanism, and for example to allow the draining or the filling with the lubricant, the casing is provided with one or several access orifices, which of course must be sealed, in normal operation, to guarantee that the sealing of the casing.

For this purpose, it is known, in particular from the document FR-2 998 879, to close the access orifice to a casing by means of a plug that includes, on the one hand, a hub carrying an O-ring type sealing member which comes into contact with the wall of the access orifice and, on the other hand, a fastening collar which holds in place the hub in the access orifice to the casing, by snap-fitting.

In order to reduce the weight as well as the cost and the manufacturing time of the plug, the latter is advantageously made integrally by injection molding of a polymeric material.

For ease of unmolding, the parting line of the plug, according to which the different parts of the injection mold are separated, generally contains the central axis of the plug, that is to say said parting line extends parallel to said central axis (and thus parallel to the direction in which the plug is then pushed into the access orifice), so that the parting line substantially corresponds to the sagittal plane that fictitiously cuts the plug, and more particularly the hub, through its middle, thus dividing (fictitiously) said plug into two semi-cylindrical half-plugs.

However, the inventors have found that such a molding-manufacturing method can have some drawbacks that affect the sealing quality provided by the plug.

Indeed, at the parting line, the junction between the two hemi-cylindrical parts constituting the plug may have misalignment or burrs, related for example to a slight mispositioning of the corresponding cavities of the injection mold.

However, such misalignments or such burrs can locally create surface irregularities, such as radial setbacks, on the side wall of the plug which receives the sealing member.

This leads indeed to locally detach said sealing member from said side wall, and thus to create a leakage (leak passage) in the concerned area.

In addition, it will be noted that it is difficult (in case of a burr creating a material over-thickness) or even impossible (in case of a radial offset of the mold cavities) to correct such defaults a posteriori, by an adapted machining. Indeed, any removal of material may affect, and in particular off-center or excessively reduce the pitch diameter of the hub, at the risk of compromising the mounting and the clamping (by elastic constriction) of the sealing member on the hub.

Moreover, some plugs, wherein the sealing member is simply pressed against a shoulder of the plug, may have an insufficient axial holding of said sealing member.

However, an insufficiently held sealing member can, first of all, slide along the hub of the plug at the time of assembly. The resulting misplacement of the seal can cause a pinching or a premature deterioration of said seal and, in any case, be at the origin of a leakage.

Furthermore, when the interior of the casing experiences a low-pressure from the surrounding atmosphere, for example because said casing is suddenly cooled by an exposure to water, which can occur with a steering casing when the vehicle crosses a puddle or a fording, a poorly held seal can be purely and simply sucked up inside the cavity of the casing, under the effect of the low-pressure, and thus dislodged from the plug, which causes an irremediable loss of sealing.

The objects assigned to the invention therefore aim to overcome the aforementioned drawbacks and to propose a new method for manufacturing a plug that allows obtaining in a simple, inexpensive and reproducible way, a plug that has a good robustness and that ensures a particularly reliable seal.

The objects assigned to the invention are achieved by means of a method for manufacturing a plug comprising a hub that extends along a central axis (XX') and that is radially delimited, about said central axis (XX'), by a side wall wherein is hollowed an annular groove surrounding the central axis (XX') and which is intended to receive a sealing member, said groove being comprised between, on the one hand, a bottom wall which forms, radially to the central axis (XX'), the bottom of said groove and, on the other hand, a first annular edge wall, and a second annular edge wall, that axially delimit said groove along the central axis (XX'), said method being characterized in that it includes a step (a) of manufacturing a first hub segment, during which a first hub segment is made, which extends along a first portion of the central axis and on which the first edge wall is formed, a step (b) of manufacturing a second hub segment, during which a second hub segment is made, which extends along a second portion of the central axis and on which the second edge wall is formed, and a step (c) of constituting the hub, during which the first hub segment is assembled with the second hub segment, in order to create the annular groove between the first edge wall and the second edge wall, so that the first hub segment and the second hub segment meet in a parting line that is secant to the central axis (XX') and secant to the bottom wall of the groove.

In this way, the layout of the intersection of the parting line with the bottom wall, that is to say the apparent layout of the junction between the first hub segment and the second hub segment, such that said junction appears from the outside on the side wall of the hub, once said assembled hub is axially contained between the first edge wall and the second edge wall, over the entire circumference of the annular groove.

Advantageously, splitting the hub, and more generally the plug, into two initially distinct parts, manufactured separately from one another, and disposing the parting line transversely and more preferably perpendicularly to the central axis (XX'), so that the central axis (XX') is substantially normal to the parting line, rather than disposing said parting line parallel to the central axis (XX'), allows manufacturing the respective annular functional areas of the first and second hub segments, and more particularly the elements of the side wall of the hub and the bottom wall of the groove, by preserving the smooth and continuous nature, without setbacks (without radial steps) nor asperities or interruptions, of the contour (preferably circular) of said functional areas, all around the central axis (XX').

Indeed, it is in particular possible to manufacture, and more particularly to mold integrally all or part of the bottom wall of the groove in a unique cavity that has been created in a single mold portion by a bore-like accurate machining, with reference to the central axis (XX'). Such a cavity will therefore have a rectified cylindrical layout, perfectly smooth, devoid of setbacks over its entire circumference, that is to say over all the azimuthal coverage of said layout, over 360 degrees about the central axis (XX').

Thus, at each given abscissa along the central axis (XX'), and more particularly at each abscissa considered in the abscissa range comprised between the abscissa of the first edge wall and the abscissa of the second edge wall, that is to say in the abscissa range corresponding to the bottom wall of the annular groove, the side wall of the hub will form an annular continuous strip, integrally molded, all around of the central axis (XX').

Such an annular strip, entirely obtained from a cavity formed (machined) contiguously, will thus have all around the central axis (XX), that is to say continuously over 360 degrees about the central axis (XX'), a closed, smooth and regular contour (an apparent circumference) without setbacks or asperities.

In other words, the orientation of the parting line chosen according to the invention is such that said parting line does not interfere with the annular, and more preferably circular, geometry of the functional areas of the hub, and in particular with the annular geometry of the bottom wall of the groove, so that said functional areas, and particularly the bottom wall of the groove, always have, in a section perpendicular to the central axis (XX'), and from the outside, at least one continuous annular strip whose layout is smooth and regular, without setbacks or asperities, so that the O-ring type sealing member can perfectly conform to said strip, following exactly the (typically circular) layout of said strip, without detaching radially from said layout, and therefore without leaving a leak passage between said sealing member and said side wall strip of the hub against which said sealing member is pressed.

Moreover, because the orientation of the parting line chosen by the invention allows giving each of the first and second hub segments a clean annular cylindrical geometry, and in particular a circular geometry of revolution centered about the central axis (XX'), the first hub segment and the second hub segment can be easily aligned, by self-centering, on the same central axis. At a given abscissa, when assembling said first and second hub segments, any eccentricity can thus be avoided, and therefore any radial offset like to cause radial setbacks in the apparent surface of the side wall of the hub.

Other objects, features and advantages of the invention will appear in more details upon reading the following description, and using the appended drawings, provided for purely illustrative and non-restrictive purposes, among which:

FIG. 1 illustrates, according to an exploded perspective rear view, a variant of a plug according to the invention.

FIG. 2 illustrates, according to an exploded perspective front view, the plug of FIG. 1.

FIG. 3 illustrates, according to an exploded view in cross-section in the sagittal plane of the plug containing the central axis, the plug of FIGS. 1 and 2.

FIG. 4 illustrates, according to an overall view in cross-section in the sagittal plane of the plug containing the central axis, the plug of FIGS. 1 to 3 being assembled, fitted with its sealing member and placed in the access orifice of a casing.

Figure 5:
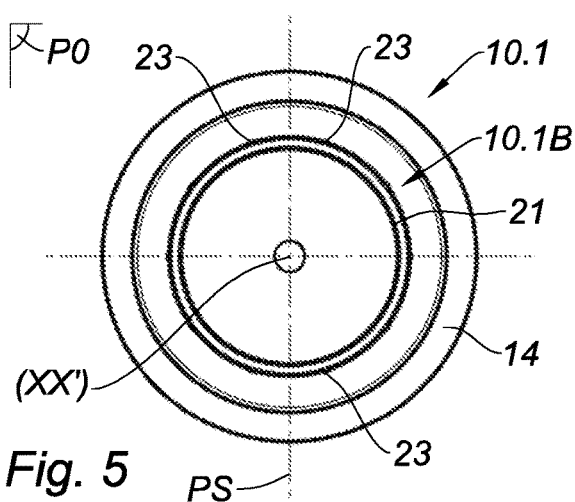
FIGS. 5 and 6 illustrate, according to respectively rear and then front projection views, the first hub segment of the plug of FIGS. 1 to 4.

The present invention concerns a method for manufacturing a plug 1.

Said plug 1 is advantageously intended to be part of a protection system 2 intended to protect a mechanism, and more particularly to protect a steering mechanism within a vehicle.

Said mechanism may for example comprise a gear reducer (in particular with a worm wheel and a worm screw), or even steering operating members including for example a drive pinion which engages a steering rack, itself mounted in translation in a steering casing so that the translational displacement of said rack controls the modification of the steering angle (yaw angle) of the steered wheels of the vehicle.

As illustrated in FIG. 4, the protection system 2 preferably comprises a casing element 3 that forms a casing wall 4 delimiting a chamber 5 intended to receive and accommodate the mechanism, said casing wall 4 having at least one access orifice 6 that allows accessing to the chamber 5, and more particularly inserting the mechanism into said chamber 5 and/or maintaining said mechanism, from the outside 7 of the casing element 3.

The plug 1 seals the access orifice 6, advantageously in a liquid water tight (liquid water present on the outside 7 of the casing 3) and lubricant-tight (lubricant contained in the chamber 5) manner.

As shown in FIG. 4, the plug 1 comprises a hub 10 extending along a central axis (XX').

In practice, said central axis (XX'), or "main axis" substantially coincides with the direction along which the plug 1 is pushed into the access orifice 6, that is to say substantially coincident with the drilling axis of said access orifice 6.

For ease of description, the term "axial" will be designated for a direction or a dimension considered in an orientation parallel to the central axis (XX'), or even coincident with said central axis (XX'), and the term "radial" will be designated for a direction or a dimension considered in an orientation transverse, and more particularly perpendicular, to said central axis (XX').

The sagittal plane of the hub 10 will be noted PS, and more generally the sagittal plane of the plug 1, which contains the central axis (XX'). This sagittal plane PS (fictitiously) divides the plug 1 into two, preferably substantially symmetrical hem i-cylinders.

The hub 10 is radially delimited about said central axis (XX'), by a side wall 10L wherein is hollowed an annular groove 11 surrounding the central axis (XX') and intended to receive a sealing member 12.

As such, it will be noted that the method comprises a step (d) of mounting a sealing member 12, during which, preferably after having formed the hub 10 and the groove 11 of the plug, an annular sealing member 12 is slipped on the hub 10 and engaged in the groove 11.

The sealing member 12 is advantageously formed in a flexible (compressible) material, distinct from the rigid material constituting the hub 10, and more flexible than the latter.

Preferably, the sealing member is formed in an elastomeric material, such as a hydrogenated butadiene-acrylonitrile copolymer, also called "hydrogenated nitrile rubber" (abbreviated "HNBR" for "hydrogenated nitrile butadiene rubber") or a butadiene-acrylonitrile copolymer, also called "nitrile rubber" (abbreviated "NBR", for "nitrile butadiene rubber").

The sealing member 12 may also be formed from any type of appropriate elastic ring having a contour closed on itself about the central axis (XX').

Particularly, the sealing member 12 may have at rest any shape of appropriate cross-section, such as a circular (O-ring) section, an oval section, a rectangular section (seal forming a "flat" strip), etc.

According to a preferred variant, particularly inexpensive to implement, the sealing member 12 is formed, as illustrated in FIG. 4, by an O-ring type seal.

As shown in FIGS. 3 and 4, the groove 11 is comprised between, on the one hand, a bottom wall 13 which forms, radially to the central axis (XX'), the bottom of said groove 11 and, on the other hand, a first annular edge wall 14 and a second annular edge wall 15, said first and second edge walls 14, 15 axially delimiting said groove 11 along the central axis (XX').

The groove 11 thus extends axially from the first edge wall 14 to the second edge wall 15, so that said first and second edge walls 14, 15 ensure, on each side of the groove 11, the axial (bi-directional) retention of the sealing member 12 in order to prevent uncontrolled axial sliding of said sealing member 12.

Preferably, for ease of manufacture and for ensuring an effective axial holding of the sealing member 12, the first edge wall 14 as well as the second edge wall 15, extend substantially in perpendicular (normal) planes 25 to the central axis (XX').

According to the invention, and shown in FIGS. 1 to 3, the method includes a step (a) of manufacturing a first hub segment 10.1, during which a first hub segment 10.1 is made, which extends along a first portion of the central axis (XX') and on which the first edge wall 14 is formed.

The first hub segment 10.1 will thus have a cylindrical shape, and more preferably substantially a revolution shape, centered on the central axis (XX').

Similarly, the method also includes a step (b) of manufacturing a second hub segment 10.2, during which a second hub segment 10.2 (initially distinct from the first hub segment 10.1) is made, which extends along a second portion of the central axis and on which the second edge wall 15 is formed.

The second hub segment 10.2 will thus (also) have a cylindrical shape, and more preferably substantially a revolution shape, centered on the central axis (XX').

The method then includes a step (c) of constituting a hub 10, during which the first hub segment 10.1 is assembled with the second hub segment 10.2, in order to create the annular groove 11 between the first edge wall 14. and the second edge wall 15, and so that the first hub segment 10.1 and the second hub segment 10.2 meet in a parting line P0 which is secant to the central axis (XX'), that is to say not parallel to said central axis (XX'), and which is secant to the bottom wall 13 of the groove 11, and more particularly secant to the bottom wall 13 over the entire circumference of said bottom wall 13.

In this way, once the hub 10 is assembled, the apparent layout of the junction between the first hub segment 10.1 and the second hub segment 10.2, as this junction appears from the outside of the plug 1 on the visible side wall 10L of the hub 10, and more particularly the layout of the intersection 16 of the parting line P0 with said bottom wall 13, is axially contained between the first edge wall 14 and the second edge wall 15 over the entire perimeter of the annular groove 11, (that is to say over the entire perimeter of said groove 11, by 360 degrees about the central axis (XX')).

In other words, the parting line P0 "opens" radially, at the (outer) side wall 10L of the hub 10, and over the entire circumference of said side wall 10L about the central axis (XX'), to an axial abscissa (or optionally to axial abscissa that can be different depending on the considered azimuth, if the parting line P0 is not exactly normal to the central axis (XX')) which is (are) comprised in the range of axial abscissa delimited by the axial abscissa of the first edge wall 14, on the one hand, and the axial abscissa of the second edge wall 15, on the other hand.

Advantageously, the fact of axially subdividing, according to the parting line P0, the hub 10 into two hub segments 10.1, 10.2 axially stacked on top of each other allows, as indicated above, to provide the sealing member 12, at the (radially centrifugal) apparent surface of the side wall 10L of the hub 10, and more particularly at the (radially centrifugal) apparent surface of the bottom wall 13, with one or more bearing surface(s) that are actually annular, because they are continuous and perfectly smooth, without radial setback, and in particular without burr or radial offset that would locally space away from the side wall 10L, and more particularly space away from the bottom wall 13 of the groove 11, the radially inner (centripetal) face of the sealing member 12 which is supposed to conform to said wall 10L, 13.

Indeed, on the same (axial) side of the parting line P0, and therefore on the same (axial) side of the intersection 16, the apparent surface of the side wall 10L of the hub, and more particularly the apparent surface of the bottom wall 13, is thus formed in one-piece, with a regular and continuous shape, without being cut by the parting line P0, and therefore without risk of being affected by a burr or by an offset of the cavities of an injection mold.

As shown in FIGS. 1, 3 and 4, the back 10.1B of the first hub segment 10.1 forms a first coupling face 10.1B intended to be axially brought closer to, and pressed against, a second coupling face 10.2A of a substantially matching shape that corresponds to the front face 10.2A of the second hub segment 10.2.

Figure 6:
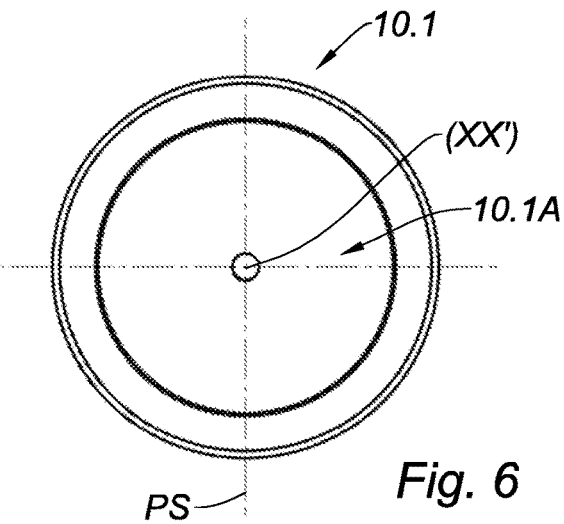
Figure 8:
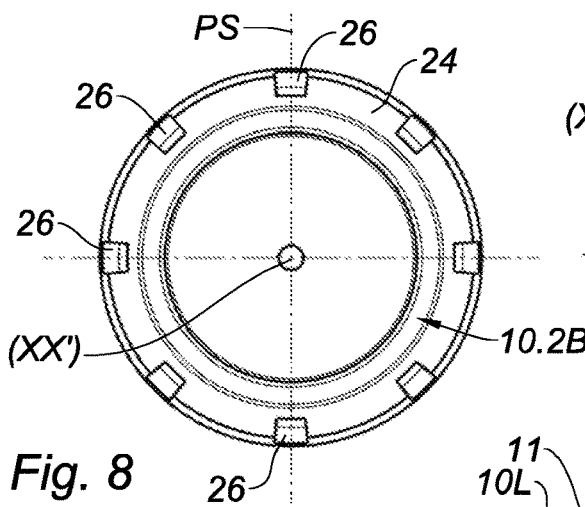
FIGS. 8 and 9 illustrate, according to respectively rear and then front projection views, the second hub segment of the plug of FIGS. 1 to 4.
Figure 9:
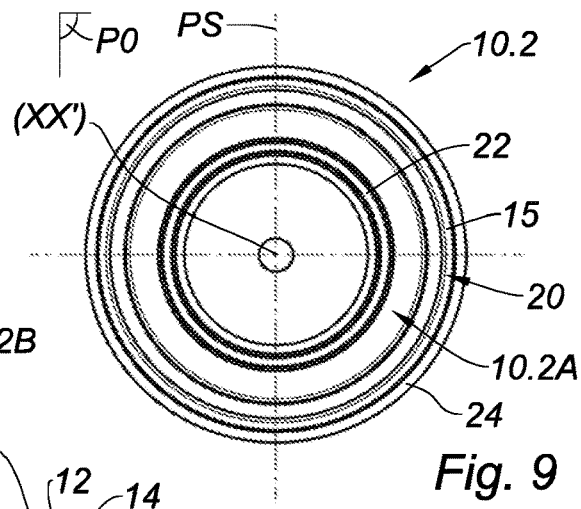

By analogy and for ease of description, the front face of the first hub segment 10.1 will be noted 10.1A, shown in particular in FIG. 6 and axially located opposite the first coupling face 10.1B, and the back of the second hub segment 10.2 will be noted 10.2B, shown in particular in FIG. 8 and axially located opposite the second coupling face 10.2A.

The first coupling face 10.1B carries a first portion of the annular groove 11, in this case at least the first edge wall 14, whereas the second coupling face 10.2A carries a second portion of the groove 11 (complementary to the first portion), in this case at least the second edge wall 15, or even preferably, both the bottom wall 13 and the second edge wall 15.

As such, according to the invention, the bottom wall 13 is preferably very predominantly carried, and more preferably entirely carried, by a single hub segment 10.1, 10.2, here the second hub segment 10.2 in FIGS. 3 and 4.

Within the concerned hub segment 10.1, 10.2, here the second hub segment 10.2, and as clearly shown in FIGS. 3 and 4, said bottom wall 13 then forms, contiguously with the edge wall 14, 15 carried by the same hub segment, here contiguously with the second edge wall 15 carried by the second hub segment 10.2, a shoulder 20.

By the expression "very predominantly carried by a single hub segment", it is meant that the axial extent of the portion of the bottom wall 13 of the groove 11 carried specifically (and thus formed in one-piece, uninterrupted) by the concerned hub segment, here the second hub segment 10.2, corresponds preferably to more than 75%, preferably more than 80%, or even substantially 100% (that is to say to the whole) of the total (apparent) axial extent X13 of the bottom wall 13, that is to say of the distance which axially separates the first edge wall 14 from the second edge wall 15 once the hub segments 10.1, 10.2 are assembled on one another.

According to a first variant (not shown), the bottom wall 13 of the groove 11 may be axially distributed for one first part on the first hub segment 10.1 and for the other second part on the second hub segment 10.2, for example so that the second hub segment 10.2 carries (axially) between 75% or 80%, and 95% of the bottom wall 13, connected to the second edge wall 15, while the first hub segment 10.1 carries the complementary axial length, namely between 5%, and 20%, or even 25% (at most), of the bottom wall 13, connected to the first edge wall 14.

The junction of the hub segments 10.1, 10.2 then takes place through the bottom of the groove 11, that is to say the intersection 16 is located axially in an intermediate portion of the groove 11, at an axial distance from each of the edge walls 14, 15.

Of course, regardless of the adopted distribution for the bottom wall 13, it is ensured that said bottom wall 13 has on a single hub segment 10.1, 10.2 at least one portion without junction (namely not cut by the intersection 16 with the parting line P0), said portion without junction corresponding here to the aforementioned second portion, whose axial extent is strictly greater than the axial extent necessary to provide an annular smooth seat to the sealing member 12, and this in order to avoid creating the slightest surface irregularity, and in particular the slightest radial setback or any hollow radially below the sealing member 12.

In other words, no possible apparent connecting line of the hub segments 10.1, 10.2 (that is to say, no intersection 16) passes under the sealing member 12 or crosses said sealing member 12.

As an indication, at least the second part, that is to say the largest part, of the bottom wall 13 may have an axial extent equal to or greater than 75%, 80% or 100% or even 110% of the predictable axial extent of the right section of the sealing member 12, that is to say in practice an axial extent equal to or greater than 75%, 80% or 100% or even 110% of the diameter of the circular cross-section of the O-ring seal 12.

Figure 10:
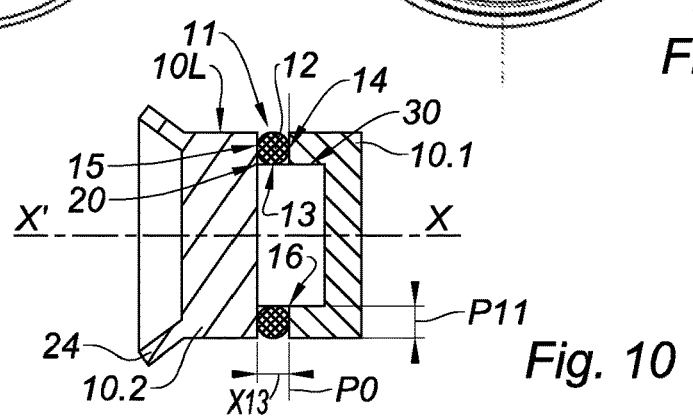
FIG. 10 illustrates, according to a schematic view in sagittal section, a variant of the plug according to the invention, wherein the first hub segment forms a female part into which the second hub segment fits, whose end of the groove bottom wall forms the male part.

According to a second variant, and as illustrated in FIG. 4 or FIG. 10, the entirety, that is to say 100%, of the bottom wall 13, and more particularly 100% of the useful axial extent X13 of said bottom wall 13, is carried by a single hub segment, here the second hub segment 10.2.

According to such variant, the intersection 16 between the parting line P0 and the bottom wall 13 is located radially below (that is to say in the radial extension) the corresponding edge wall, here the first edge wall 14 in FIGS. 4 and 10.

Advantageously, according to this second variant, it is sufficient for the other hub segment (here the first hub segment 10.1) to simply carry the (first) edge wall 14 which is necessary and sufficient to complete the delimitation of the groove 11.

Such an arrangement allows simplifying not only the manufacturing of the first hub segment 10.1, but also the assembly of the two hub segments 10.1, 10.2, since it is sufficient to form, in the first hub segment 10.1, a first flat edge wall 14, in the form of a flat disc (here perpendicular to the central axis (XX')), then to cap the second hub segment 10.2 with said first hub segment 10.1, in the manner of a cover, in order to axially cover the shoulder 20.

According to a first sub-variant of this second variant, which corresponds to FIGS. 3 and 4, the first edge wall 14 of the first hub segment 10.1, which is preferably coincident with the parting line P0, is laid "flat" against the edge of the second hub segment 10.2, that is to say said first edge wall 14 tangentially clings to the axial end of the bottom wall 13, the axial abutment of the first hub segment 10.1 abutting against the second hub segment 10.2 operating exactly according to the intersection 16 (visible from the outside of the plug 1).

This avoids any risk of offset, or subsistence of a burr or any other defect at said intersection 16, and more generally at the functional surface of the bottom wall 13, located in the abscissa range occupied by the sealing member 12.

According to a second sub-variant, corresponding to FIG. 10, the first hub segment 10.1 may form a female element in which a bore 30 is drilled wherein the bottom wall 13 of the groove of the second hub segment 10.2 is fitted preferably with a tight fit.

According to such a sub-variant, the bore 30, and therefore the first hub segment 10.1, axially overlaps the bottom wall 13, which is thus partially covered by said first hub segment 10.1.

The axial abutment of the first hub segment 10.1 against the second hub segment 10.2 will then be preferably performed by the bottom of the bore 30 bearing against the edge of the bottom wall 13, axially recessed (inwardly of the first hub segment 10.1) from the first edge wall 14 carried by said first hub segment 10.1.

In any event, again, the apparent connection between the first hub segment 10.1 and the second hub segment 10.2, that is to say the intersection 16, will be radially below the first edge wall 14, at the edge of the residual apparent bottom wall (that is to say at the edge of the portion of the bottom wall 13 that is not covered by the first hub segment 10.1), without risk of interfering with the seat of the sealing member 12.

Advantageously, in all cases, regardless of the considered sub-variant, the portion of the bottom wall 13 made contiguously, and therefore without asperities, has a particularly extended surface and thus provides the sealing member 12 with a smooth seat sufficiently wide axially to avoid any leakage.

More generally, regardless of the considered variant, the portion of the bottom wall 13 on which rests and lays the sealing member 12 is smooth, regular and devoid of connection, the parting line P0, and more particularly the intersection 16, is not crossing the sealing member 12.

Of course, once the groove 11 is formed (reconstituted) by joining the first and the second hub segments 10.1, 10.2, the sealing member 12 can, during step (d), be slipped on the hub 10 and slid axially along the latter, until said sealing member 12 is introduced in the groove 11 in axial abutment against the edge walls 14, 15.

This being so, in absolute terms, the sealing member 12 can also be engaged in the shoulder 20 (of the second hub segment 10.2) before attaching the first segment 10.1 to the second hub segment 10.2, under the condition of not risking to pinch the sealing member 12 when placing the first hub segment 10.1 on the second hub segment 10.2.

Moreover, it is not excluded to consider, in absolute terms, an oblique parting line P0 with respect to the central axis (XX').

However, when considering conventionally the central axis (XX') as a yaw axis, the attitude of the parting line P0 (that is to say the pitch and/or roll inclination of said parting line P0) remains preferably low, the pitch angle and the roll angle of the parting line P0, with respect to the central axis (XX'), being less than 30 degrees, 20 degrees, 10 degrees, or even more preferably less than 5 degrees.

In a particularly preferable manner, the parting line P0 is perpendicular (normal) to the central axis (XX'), that is to say has a pitch angle and a roll angle equal to zero.

Advantageously, such an arrangement is perfectly suitable for a "clean" cut of the revolution shape of the hub 10, and more particularly of the bottom wall 13, at a single abscissa along the axis central (XX').

First of all, a parting line P0 perpendicular to the central axis (XX') helps to make contiguously a bottom wall 13 of the groove 11 that has an important axial extent, and therefore an axial scope sufficient for said bottom wall 13, formed contiguously, to support the sealing member 12 by itself.

Then, this facilitates the individual manufacture of the hub segments 10.1, 10.2 and in particular allows imparting to the first hub segment 10.1 and to the second hub segment revolution shapes, and more particularly rotationally-invariant coupling faces 10.1B and 10.2A, which allows assembling together said first and second hub segments 10.1, 10.2 regardless of the yaw orientation of each of said hub segments 10.1, 10.2.

It is therefore possible to "blindly" assemble said first and second hub segments 10.1, 10.2, without having to take any angular reference for positioning one segment with respect to the other.

Preferably, the first hub segment 10.1 and/or the second hub segment 10.2 is integrally formed of (rigid) contiguously of a polymeric material.

The use of a polymer advantageously enables to combine lightness, intrinsic tightness, corrosion resistance, and low-cost supply.

The chosen polymer is preferably a thermoplastic.

Said polymer is advantageously able to withstand, and in particular to maintain a sufficient rigidity over the whole predictable operating temperature range of the protection system 2, in particular over the whole range comprised between −30° C. and +125° C., or even between −40° C. and +135° C. in case where the protection system 2 concerns a power steering device for a vehicle.

As an indication, the breaking point of said polymer may be equal to or greater than 40 MPa over the whole afore-mentioned temperature range.

In a particularly preferable manner, the first hub segment 10.1 and/or the second hub segment 10.2 is formed by injection molding.

The plug 1 can thus be mass-produced quickly and at a low cost.

Preferably, during step (a) of manufacturing the first hub segment, a protruding coupling crown 21 centered on the central axis (XX') is formed on said first hub segment 10.1, as illustrated in FIGS. 1, 3, 4 and 5.

Said coupling crown 21 forms a sort of tube axially protruding on the first coupling face 10.1B and axially protruding relative to the parting line P0 towards the second hub segment 10.2.

During step (b) of manufacturing the second hub segment, a coupling slot 22 with a shape substantially matching the shape of the coupling crown 21 is then formed in the second hub segment 10.2, as illustrated in FIGS. 2, 3 and 4.

In this case, said coupling slot 22 is cut into the second coupling face 10.2A in axial recess from the parting line P0 with respect to the first hub segment 10.1.

It is then advantageously possible, during step (c) of constituting the hub 10, to axially interlock the coupling crown 21 in the coupling slot 22.

The assembly of the hub 10 may thus advantageously be operated, whatever the chosen arrangement for the coupling members 21, 22, through an (elastic) tight-interlocking.

Regardless of how the first hub segment 10.1 and of the second hub segment 10.2 are abutted, interlocked when appropriate, and preferably fixedly held together, the assembly of said hub segments 10.1, 10.2 may be reinforced by bonding or by heat-welding, for example by (rotary) friction welding through ultrasonic welding, or through infrared welding.

Advantageously, the use of a contact of the type cylinder/cylinder (crown 21 in slot 22 in FIGS. 3 and 4, or bottom wall 13 in bore 30 in FIG. 10) provides a self-centering effect, which automatically aligns the two hub segments 10.1, 10.2 with each other during assembly, and thus avoids any radial offset between these two elements.

Figure 7:
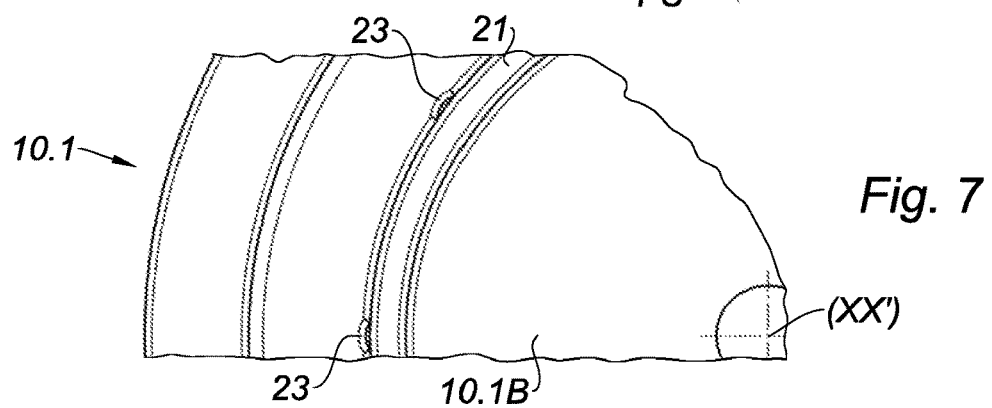
FIG. 7 is a detail view of the first hub segment of FIG. 5.

Preferably, as in particular shown in FIGS. 1 and 7, the coupling crown 21 is provided with radially protruding lugs 23, allowing the automatic clamping of said coupling crown 21 in the coupling slot 22.

Preferably, the lugs 23 protrude over the (entire) axial height of the coupling crown 21 and preferably centrifugally on the radially outer face of said coupling crown 21.

Of course, in a variant, it is possible for example to provide for lugs 23 protruding on the radially inner face or on both radially inner and radially outer faces of the coupling crown 21.

The lugs 23, of which number may for example be comprised between three and twelve, are preferably evenly distributed in azimuth (yaw) about the central axis (XX'), both for ease of manufacture and for balancing the centering of the first hub segment 10.1 relative to the second hub segment 10.2 upon force-assembly by interlocking.

The local over-thickness of the coupling crown 21 provided by the lugs 23 allows obtaining an effective clamping (jamming) of said crown 21 into the coupling slot 22 while accommodating the possible dimensional changes related to the manufacturing tolerances, and in particular compensating the possible radial clearances without risk of bursting the coupling slot 22 by wedge effect.

Moreover, the plug 1 may be held fixed to the access orifice 6 by any appropriate fastening member, formed on either one of the hub segments 10.1, 10.2.

Thus, for example, it is possible to provide, on the side wall 10L of the hub, for a net-like fastening member allowing the screwing of the plug 1 in a threaded portion of the access orifice 6.

However, according to a preferred variant, and as shown in particular in FIGS. 1, 4, 8, and 10, the second hub segment 10.2 is provided (preferably contiguously) with a fastening collar 24 arranged to cooperate by snap-fitting with the wall of an access orifice 6 designed to receive the plug 1.

Preferably, the collar 24 has a truncated-cone shape, centered on the central axis (XX') and which widens in the direction opposite to that of the first hub segment 10.1.

Advantageously, using a fastening member of the elastic collar 24 type allows a quick and simple fastening of the plug 1 inside the access orifice 6, against a flange 25 of said access orifice 6 recessed from the apparent surface of the casing wall 4, which allows housing the plug 1 fully recessed from said apparent (outer) surface of the casing wall 4, inwardly of the chamber 5, and thus avoids any accidental removal of the plug 1 by an obstacle or a tool located outside 7 the casing.

According to a preferred feature which may constitute a full-fledged invention, the hub 10, and more generally the plug 1 is formed in a single piece or on the contrary by assembling hub segments 10.1, 10.2 according to the invention, the fastening collar 24 is provided, preferably on its radially inner (centripetal) face oriented towards the central axis (XX'), with non-through recesses 26 that locally reduce the thickness E24 of said fastening collar 24 in order to improve the flexibility.

Such recesses 26 are preferably from six to twelve, for example eight (FIG. 8), and preferably evenly distributed in yaw about the central axis (XX') in order to homogenize the capacity of elastic deformation of the collar 24 over its entire periphery.

Said recesses 26 are preferably in the form of depressions, in any form compatible with an axial unmolding of the collar, and more generally compatible with an axial unmolding of the second hub segment 10.2 in order to facilitate the manufacturing of said second hub segment 10.2.

Thus, the recesses 26 may have for example a rectangular shape, with adapted relief angles, which opens on the free axial end of the collar (on the side of the large base of said collar).

Of course, the invention also concerns as such a plug 1 obtained by a method according to either of the features described previously.

As indicated hereinabove, such a plug 1 is preferably capable of withstanding operating temperatures that range at least from −30° C. to +125° C., or from −40° C. to +135° C.

As an indication, the overall diameter D1 of the plug 1 (FIG. 4), which here corresponds to the diameter of the large base (free end) of the collar 24 is preferably substantially comprised between 20 mm and 130 mm and, in the case of a preferred example, corresponding in particular to FIGS. 3 and 4, in the order of 37 mm.

The overall diameter D10L of the side wall 10L of the hub (which corresponds to the nearest guide clearance, to the diameter of the bore of the access orifice 6) is preferably comprised between 20 mm and 130 mm, and in particular 35 mm in the aforementioned example.

The depth P11 of the groove 11, that is to say the radial distance between the overall side wall 10L and the bottom wall 13, is preferably comprised between 1 mm and 3 mm, and in particular 1.25 mm in the aforementioned example.

The overall axial extent X10.1 (FIG. 3) of the first hub segment 10.1 is preferably comprised between 3 mm and 10 mm (3 mm in the example above), while the overall axial extent X10.2 of the second hub segment is preferably is comprised between 4 mm and 15 mm (the first hub segment 10.1 being thinner than the second hub segment 10.2) and in particular of 5.6 mm in the example above.

The overall axial extent X1 (FIG. 4) of the plug 1 is preferably comprised between 4 mm and 15 mm, in particular 6.3 mm in the aforementioned example, and is preferably less than the sum of the individual axial extents specific to each hub segment 10.1, 10.2, because of the partial axial overlap of the first hub segment 10.1 and of the second hub segment 10.2, in particular at the interface between the coupling crown 21 and the coupling slot 22 or between the bore 30 and the bottom wall 13.

The invention also concerns as such the use of a plug 1 according to the invention in order to seal the access orifice 6 of a steering casing 3 belonging to a steering device, in particular a power steering device.

The invention finally concerns a steering device for a vehicle comprising at least a steering mechanism such as a gear reducer, which is housed in a steering casing 3 that has a casing wall 4 having at least one access orifice 6 sealed by a plug 1, said plug 1 comprising a hub 10 extending along a central axis (XX') substantially coinciding with the central axis of the access orifice 6, and said hub 10 being radially delimited about said central axis (XX'), by a side wall 10L wherein is hollowed an annular groove 11 that surrounds the central annular axis (XX') and that receives a sealing member 12 coming into contact with the casing wall 4, said groove 11 being comprised between, on the one hand, a bottom wall 13, which forms radially to the central axis (XX'), the bottom of said groove 11 and, on the other hand, a first annular edge wall 14, and a second annular edge wall 15, axially delimiting said groove 11 along the central axis (XX'), the hub 10 of the plug 1 (and more generally the plug 1 as a whole) being formed by joining a first hub segment 10.1 extending along a first portion of the central axis (XX') and on which the first edge wall 14 is formed, and a second hub segment 10.2, extending along a second portion of the central axis (XX') and on which the second edge wall 15 is formed, the first hub segment 10.1 and the second hub segment 10.2 being assembled together such that the first hub segment and the second hub segment meet according to a parting line P0 secant to the central axis (XX') and secant to the bottom wall 13 of the groove.

Thus, the layout of the (apparent) intersection 16 of said parting line P0 with said bottom wall 13 is axially contained between the first edge wall 14 and the second edge wall 15 along the entire perimeter of the annular groove 11.

Advantageously, the invention therefore allows making a particularly simple plug 1 from only three distinct parts, slipped on each other, namely: a first hub segment 10.1, a second hub segment 10.2, and a sealing member 12.

It is also noted that the choice of combining a separate manufacturing of the hub segments 10.1, 10.2 and an adjoining assembling of said hub segments against each other according to a parting line P0 that is secant, and more particularly normal, to the central axis (XX'), offers several advantages.

Such a combination allows, on the one hand, as said above, making first of all easily by molding operation the hub segments 10.1, 10.2 which have each initially an easily unmoldable shape according to the central axis (XX'), and that is a revolution shape that provides a smooth groove bottom wall 13, devoid of asperities likely to affect the sealing, and then obtaining, after assembling the two hub segments, a groove 11 delimited by two edge walls 14, 15 (that is to say a shape that would not in itself be unmoldable according to the central axis (XX')) ensuring a bidirectional retention of the sealing member 12, on either side of said sealing member.

Such a combination allows on the other hand detecting earlier the possible manufacturing defects of the hub segments 10.1, 10.2 and thus reducing waste in case of rejection, since only the defective hub segment will be rejected, and not the plug 1 as a whole.

Such a combination finally allows making a simple assembly of the hub 10, preferably by self-centering interlocking of the hub segments, without any particular need of providing for a complex and expensive tooling to accurately position and hold one hub segment 10.1 relative to the other 10.2.

Of course, the invention is in no way limited to the sole variants described previously, those skilled in the art being in particular able to freely isolate or combine either of the aforementioned features, or to substitute them with equivalents.

The invention claimed is:

1. A method for manufacturing a plug comprising a hub that extends along a central axis and that is radially delimited about the central axis, by a side wall in which is hollowed an annular groove surrounding the central axis and which is configured to receive a sealing member, the annular groove being defined between, on the one hand, a bottom wall which forms, radially to the central axis, a bottom of the annular groove and, on the other hand, a first annular edge wall, and a second annular edge wall, that axially delimit the annular groove along the central axis, the method including:
    a step (a) of manufacturing a first hub segment, during which the first hub segment is made, which extends along a first portion of the central axis and on which the first annular edge wall is formed,
    a step (b) of manufacturing a second hub segment, during which the second hub segment is manufactured separately, distinct from the first hub segment, which extends along a second portion of the central axis and on which the second annular edge wall is formed, and
    after the manufacturing of the first hub segment and the second hub segment, a step (c) of constituting the hub, during which the first hub segment is assembled with the second hub segment in order to create the annular groove between the first annular edge wall and the second annular edge wall, and so that the first hub segment and the second hub segment meet according to a parting line that is secant to the central axis and secant to the bottom wall of the groove;
    wherein the second hub segment is provided with a fastening collar arranged to cooperate by snap-fitting with a wall of an access orifice adatped to receive the plug; and wherein the fastening collar is provided with non-through recesses that locally reduce a thickness of the fastening collar in order to improve flexibility of the fastening collar.

2. The manufacturing method according to claim 1, wherein the parting line is perpendicular to the central axis.

3. The manufacturing method according to claim 1, wherein the bottom wall is predominantly carried by the second hub segment, within which the bottom wall forms contiguously with the second annular edge wall, a shoulder.

4. The manufacturing method according to claim 1, wherein the assembly of the first hub segment with the second hub segment is operated by tight-interlocking.

5. The manufacturing method according to claim 1, wherein
    during the step (a) of manufacturing the first hub segment, a protruding coupling crown centered on the central axis is formed on the first hub segment,
    during the step (b) of manufacturing the second hub segment, a coupling slot with a shape substantially matching a shape of the coupling crown is formed in the second hub segment, and
    during the step (c) of constituting the hub, the coupling crown is axially interlocked in the coupling slot.

6. The manufacturing method according to claim 5, wherein the coupling crown is provided with radially protruding lugs, allowing automatic clamping of the coupling crown in the coupling slot.

7. The manufacturing method according to claim 1, wherein the first hub segment and/or the second hub segment is formed contiguously of a polymeric material.

8. The manufacturing method according to claim 1, wherein the first hub segment and the second hub segment are each formed of rigid polymeric material, while the sealing member is formed of a material distinct from the rigid polymeric material and more flexible than the rigid polymeric material.

9. The manufacturing method according to claim 1, further comprising a step (d) of mounting the sealing member, during which an annular elastomeric sealing member of the O-ring type is slipped on the hub and engaged in the annular groove.

* * * * *